Dec. 28, 1965 L. A. MOE 3,226,635
TESTING APPARATUS AND METHOD FOR MEASURING DIELECTRIC
CONSTANT OF MATERIALS BY NULL-BALANCING
A TUNED OSCILLATOR TO A STANDARD
RADIO FREQUENCY
Filed Jan. 25, 1962 7 Sheets-Sheet 1

INVENTOR.
LOWELL A. MOE
BY
Carlsen & Carlsen
ATTORNEYS

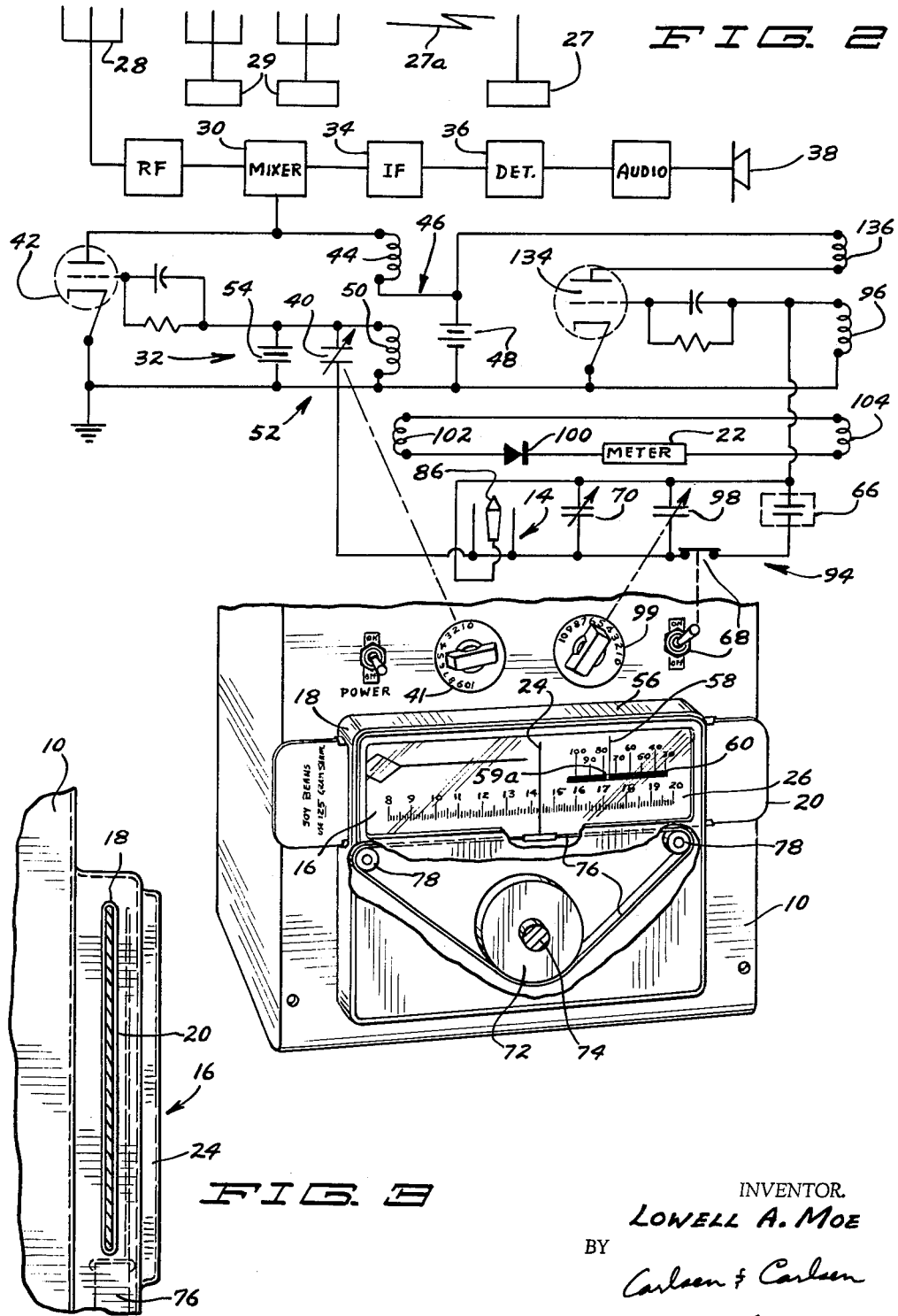

Dec. 28, 1965     L. A. MOE     3,226,635
TESTING APPARATUS AND METHOD FOR MEASURING DIELECTRIC
CONSTANT OF MATERIALS BY NULL-BALANCING
A TUNED OSCILLATOR TO A STANDARD
RADIO FREQUENCY
Filed Jan. 25, 1962     7 Sheets-Sheet 3
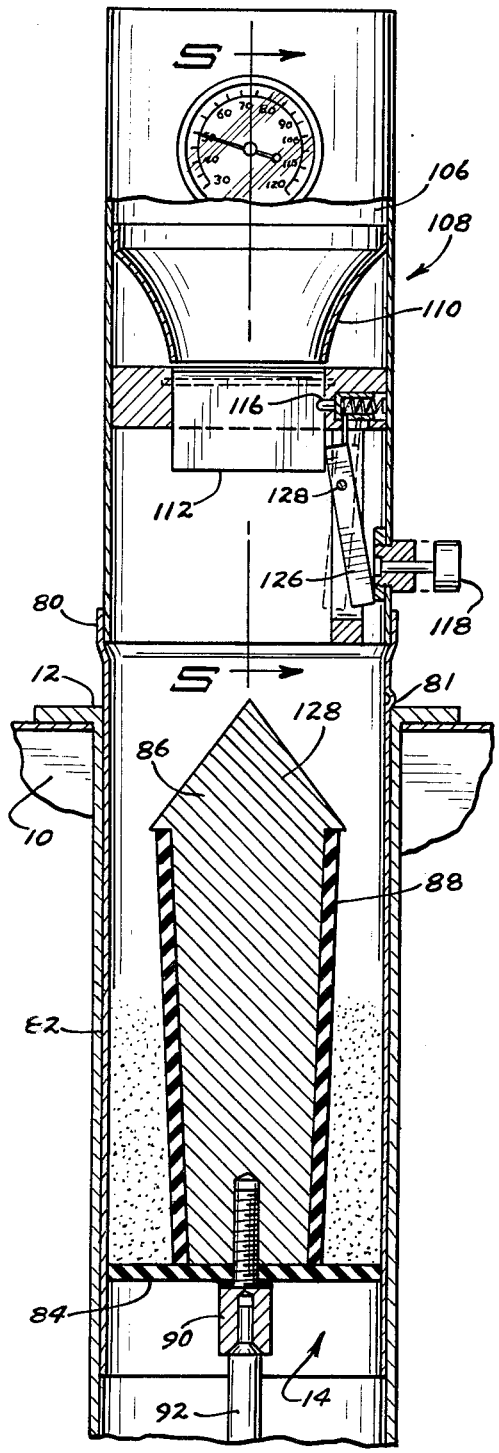
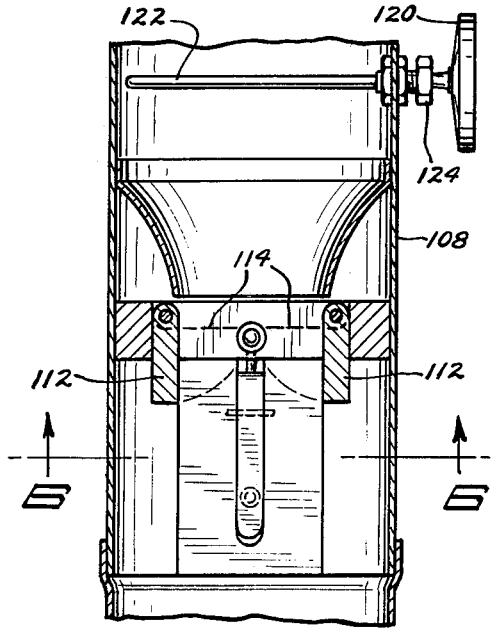
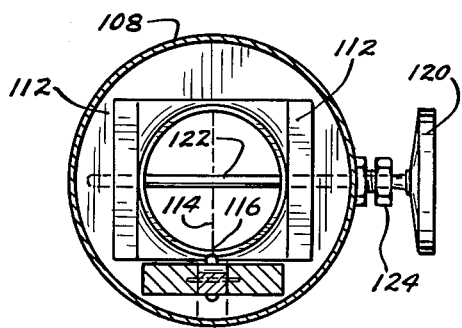
INVENTOR.
LOWELL A. MOE
BY
Carlsen & Carlsen
ATTORNEYS Dec. 28, 1965 L. A. MOE 3,226,635
TESTING APPARATUS AND METHOD FOR MEASURING DIELECTRIC
CONSTANT OF MATERIALS BY NULL-BALANCING
A TUNED OSCILLATOR TO A STANDARD
RADIO FREQUENCY
Filed Jan. 25, 1962 7 Sheets-Sheet 4
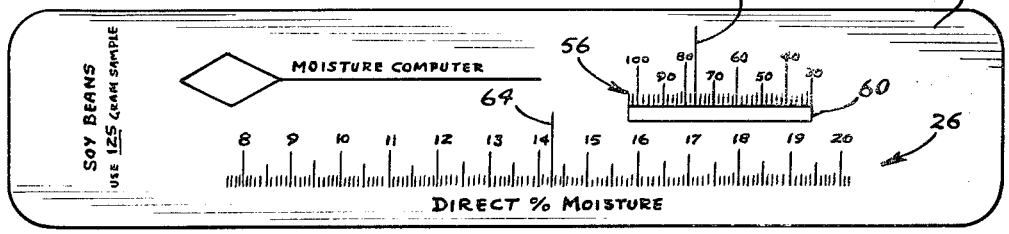
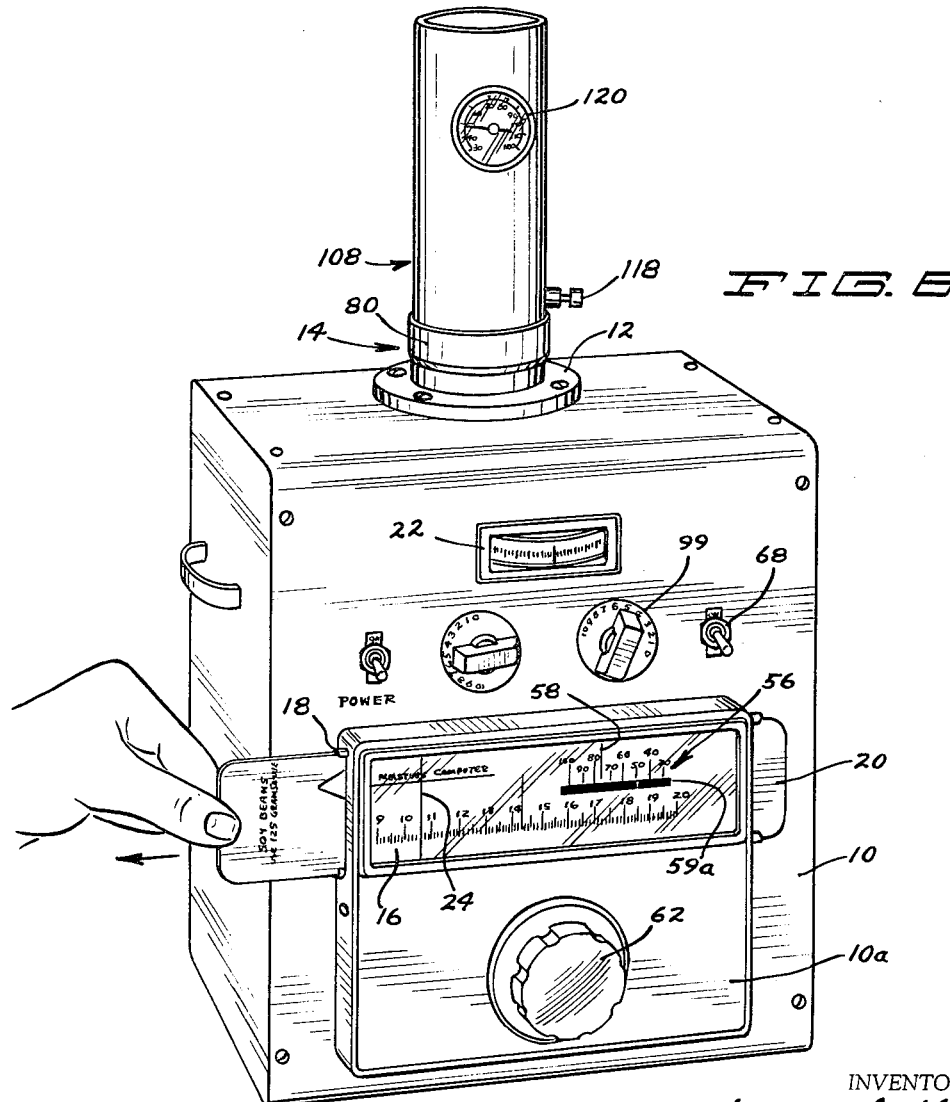
INVENTOR.
LOWELL A. MOE
BY
Carlsen & Carlsen
ATTORNEYS

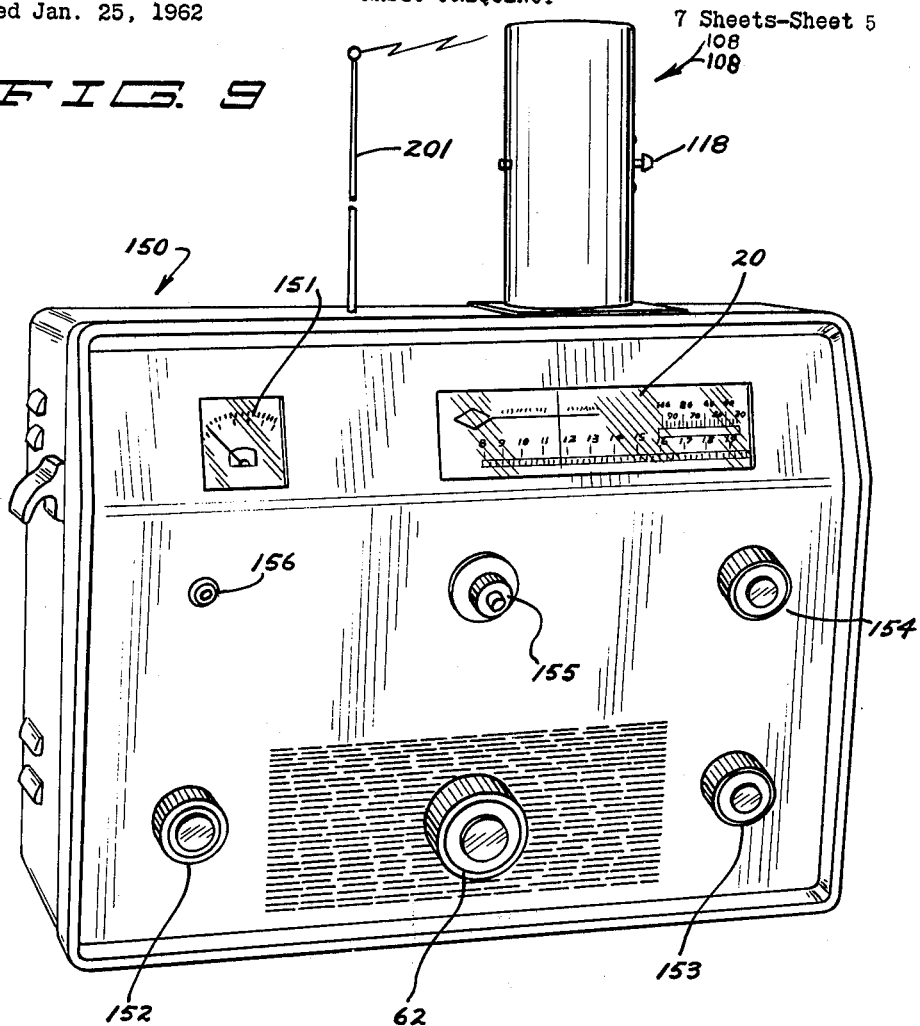

INVENTOR.
LOWELL A. MOE
BY
Carlsen & Carlsen
ATTORNEYS

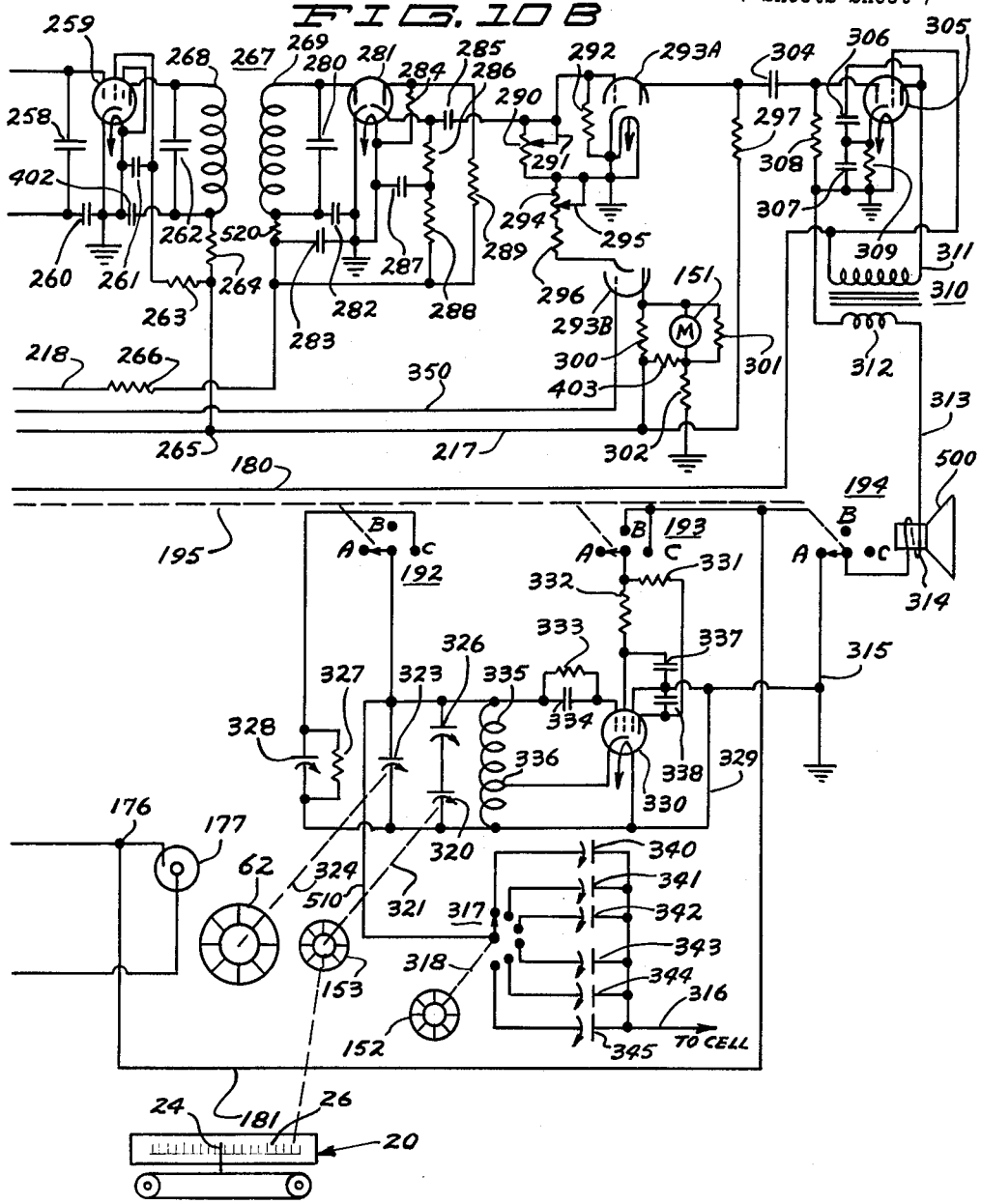

United States Patent Office 3,226,635
Patented Dec. 28, 1965

3,226,635
TESTING APPARATUS AND METHOD FOR MEASURING DIELECTRIC CONSTANT OF MATERIALS BY NULL-BALANCING A TUNED OSCILLATOR TO A STANDARD RADIO FREQUENCY
Lowell A. Moe, Minneapolis, Minn., assignor to F. H. Peavey and Company, Minneapolis, Minn., a corporation of Minnesota
Filed Jan. 25, 1962, Ser. No. 168,788
12 Claims. (Cl. 324—61)

This is a continuation in part of a pending application for United States Letters Patent in the name of Lowell A. Moe having a Serial No. 803,727 and a filing date of April 2, 1959, now Patent No. 3,081,429 issued March 12, 1963.

This invention relates to improvements in meters of the electrical reactance type and in methods of determining the content or percent amount of an ingredient, for example moisture, contained in a sample of material and more particularly to apparatus and methods of providing an accurate and consistent temperature compensated indication of the ingredient amount. This invention further facilitates interchangeability between a plurality of meters of detachable electrodes used in contact with the material being examined. In practice this invention has been successfully utilized in accurately and consistently providing temperature compensated moisture content indications of various grains, corn, metallic ores and the like.

The principle under which this invention operates has been well known for some time and it has been the usual practice in prior art to ignore coaction between certain critical variables in making measurements resulting in readings which may vary from one measurement to the next. It is well known that the moisture content of materials as well as the content of certain other ingredients such as oils, etc., in a material have a direct and substantial effect on the dielectric qualities of the material. By measuring the capacitance of the material by placing same between two electrodes the dielectric quality and thus the ingredient amount therein can be determined. One of the electrodes is preferably electrically insulated from the material to prevent a low electrical resistance between the two electrodes which could adversely affect the capacitance measurement.

Prior art apparatus and methods employing the above stated principle of operation have often ignored the coaction of variations in temperature and frequency of electrical signal imposed across the electrodes, although providing fairly accurate readings, limit the consistent accuracy of these devices. Other prior art devices designed to be utilized for testing a plurality of different materials for moisture content and the like have resorted to charts to covert a dial reading to the moisture content reading. Additionally as various meters are used over a period of time electrical components and critical metal parts in the electrodes may vary resulting in a variation of readings between different meters employing the same type apparatus.

Contrary to some prior art teachings which either ignored or inferred temperature variations of the sample were unimportant, it was discovered that sample temperature plays a very important role in accurately determining ingredient content by the electrical reactance method even at radio frequencies of about 20 megacycles. For example, in testing soy beans for moisture content in using a 125 gram sample a decrease of one degree Fahrenheit has resulted in an increased reading of about 0.1 percent moisture. Similarly at about 20 megacycles a frequency deviation of 0.5 megacycle has caused a reading deviation of 0.1 percent ingredient content from the "true" reading. It is apparent that since at least two variables are critical that variations of both may cancel errors and that accurate and consistent readings cannot be obtained unless both variables are either controlled or properly analyzed and compensated therefor.

According to this invention a central extremely stable frequency source is utilized, such as the radio frequency emissions from the radio station WWV of the National Bureau of Standards, to provide a single reference frequency for use by all meters. Accordingly the local oscillator of a radio receiver is utilized to provide a reference frequency to a resonant circuit in the meter which is connected to measure the capacitance of the ingredient. The just described arrangement provides the best available frequency reference to all meters but still utilizes a very small amount of equipment to provide same resulting in low cost and increased portability.

A further embodiment of apparatus which may be utilized, in cooperation and combination with a remotely located source of stable frequency reference, may be described as a double conversion super heterodyne radio receiver which is adapted to operate in the range of the remotely located source of signal. The manner in which this type of equipment may be utilized is believed to be essentially that of providing a filter which may be adjusted to provide an output over an extremely narrow range of frequencies so that the filter may be adjusted in accordance with a remotely located stable source of signal of predetermined frequency and the output of the filter, or receiver, will be at a maximum value when a signal, from another source, is of the same frequency as the source of reference frequency. The signal from another source would, of course, eminate from an oscillator which included a sample of material upon which an ingredient content determination is to be made and a suitable adjustable impedance element in the frequency determining circuit for the oscillator. Adjustment or calibration of signal receiving apparatus with respect to a remote standard reference and subsequent adjustment of the ingredient content measuring device to the same frequency will provide a uniform system and method for making such determinations regardless of the location at which such measurements are performed.

A detachable and interchangeable test cell is utilized with the meter without requiring exacting and tedious standardization of each cell to a particular meter circuit. Each meter is provided with a stable simulated load insertable during calibration thereof in parallel circuit relation with the test cell to provide electrical calibration of each cell as it is inserted into the meter. In this manner small capacitance variations from one test cell to another are compensated for in the meter thereby providing the same effective empty cell capacitance to the resonant circuit regardless of what capacitance the empty test cell presents. Therefore, it is seen that each meter utilizes exactly the same reference frequency in relation to the same effective empty cell capacitance resulting in a capacitance variation in the resonant circuit being the same for one sample regardless of which meter is utilized.

An additional variation in readings may be caused by the manner in which the material to be tested is located between the electrodes, for example, in extremely granular material the packing, bushel weight variations and the disposition of the material with respect to the electrodes affect the actual capacitance provided between the electrodes by the material. This variation is circumvented by this invention in providing a coaxial test cell having bushel weight compensated shaped electrodes and a material insertion means for dispensing a predetermined weight of material uniformly and quickly between the electrodes. Therefore the established meter accuracy is preserved.

Compensation in the readings for temperature variations in the material being tested is provided by a relative adjustment between a dial card and a pointer connected to the resonant circuit for tuning same, providing a linear adjustment between the pointer and dial corresponding to the difference in the material temperature and the temperature then indicated on the dial. This type of correction for temperature is possible since the material temperature linearly affects the capacitance, i.e., dielectric quality, of the material under test. Therefore, for the same variation in capacitance different amounts of moisture (ingredient content) are indicated at different material temperatures. A variation in temperature from 30° F. to 100° F. for soy beans means a variation of about 3.5% in moisture content for the same variation in capacitance.

Additionally different materials and different ingredients provide different capacitance variations with temperature. Therefore, in order to obtain maximum capacitance variation for all materials and ingredients, it is necessary to initially calibrate the meter for each ingredient and material to be tested with an accepted standard. This invention provides a detachable dial card for each ingredient in each material to be tested which is movably inserted in the meter, the meter and test cell are calibrated to the inserted card at a predetermined temperature and then the measurement is made to provide a temperature compensated indication of ingredient content in the sample.

Accordingly it is an object of this invention to provide ingredient content meters which operate at diverse locations with a single reference frequency source.

It is another object of this invention to provide ingredient amount determining apparatus of the electrical measurements type wherein the ingredient amount indication is integrally adjusted to indicate a temperature compensated reading.

It is a further object of this invention to provide ingredient determining apparatus of the electrical measurements type and methods of operating same wherein accurate temperature compensated readings may be taken from at least 30° F. through 100° F. sample temperature.

It is still another object of this invention to provide calibration means in an ingredient meter wherein the meter, the container or cell wherein the material to be measured is located and the dial are calibrated to compensate for electrical changes in the meter and cell.

It is still a further object of this invention to provide an ingredient content meter having improved loading means for inserting a predetermined weight of material to be examined between two electrodes for determining the dielectric qualities of the material.

It is another object of this invention to provide an ingredient content meter with an improved detachable test cell.

It is a still further object of this invention to provide ingredient content meters with interchangeable temperature compensating dials for indicating directly the ingredient content.

Another object of this invention is to provide an ingredient content measuring system in which a standard stable source of reference signal may be transmitted to at least one of a plurality of remotely positioned adjustable receivers therefor and in which said receivers may be utilized in directly determining the ingredient content of materials to be measured in a uniform manner.

A further object of this invention is to utilize a double conversion super heterodyne receiving apparatus in an ingredient content measuring system.

A still further object of this invention is to provide an ingredient content measuring system which includes adjustable filtering apparatus.

These and other more detailed and specific objects will be disclosed in the course of the following specification, reference being had to the accompanying drawings, in which:

FIG. 2 is a schematic diagram of the meter circuits and the operation of the indicator assembly with a dial card being in a "calibrate position."

FIG. 3 is a partial enlarged side elevational view of the FIG. 1 meter looking from the left to illustrate the dial slide construction.

FIG. 4 is a fragmentary sectional view of a detachable test cell and material insertion can shown mounted in the FIG. 1 meter.

FIG. 5 is a vertical sectional view taken on lines 5—5 of FIG. 4.

FIG. 6 is an axial view taken on lines 6—6 in FIG. 5.

FIG. 7 is a plan view of an exemplary detachable dial card for use with the FIG. 1 meter.

FIG. 8 shows the dial card of FIG. 7 in a "temperature compensated position" indicating the moisture content of material examined by the FIG. 1 meter.

FIG. 9 is a perspective drawing of the apparatus of one embodiment of the present invention.

Figure 10A:
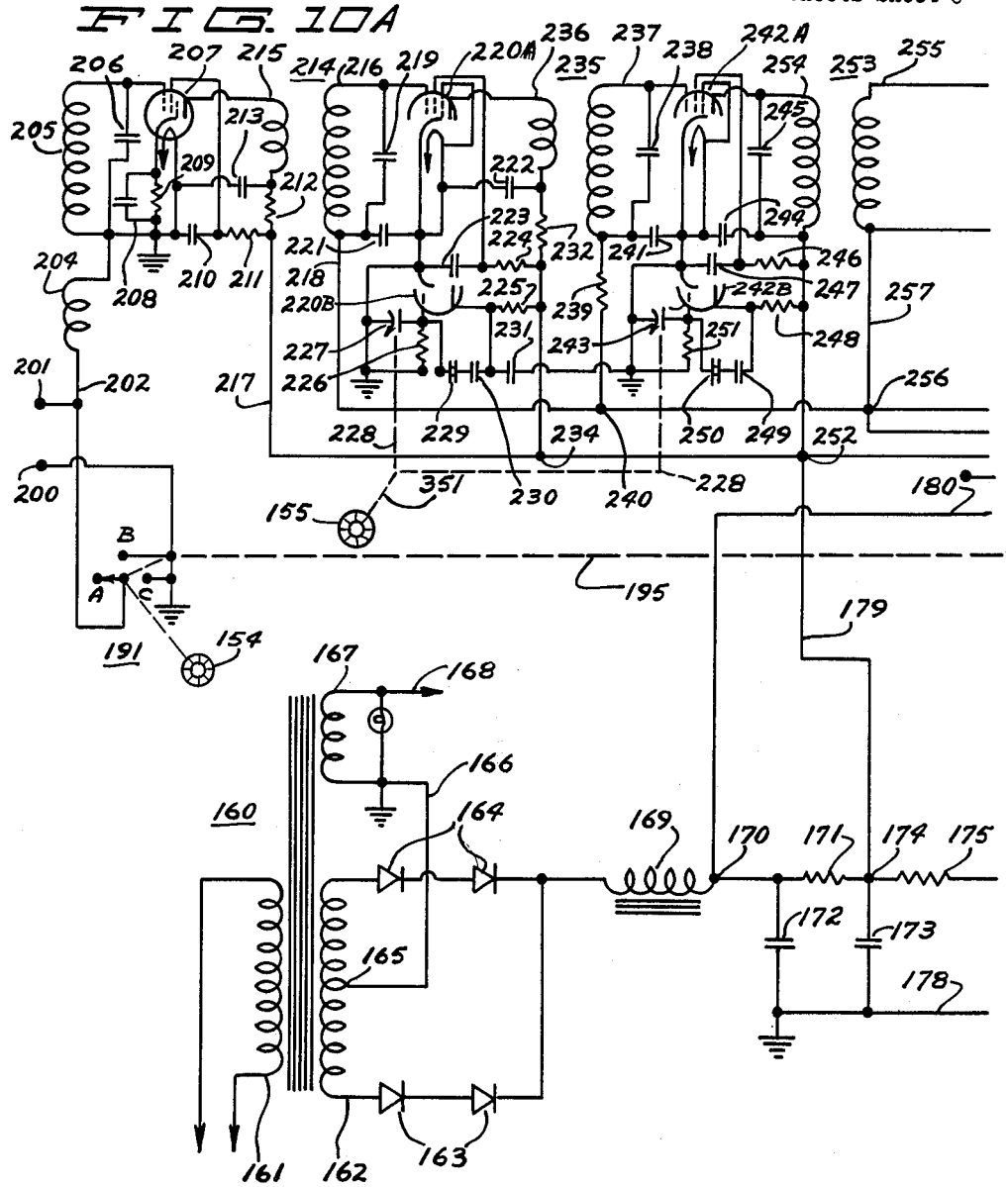

FIGS. 10a and 10b comprise an electrical schematic drawing of the apparatus of the embodiment shown in FIG. 9.

With reference now to the drawings like numbered parts in the various figures denoted like parts wherein numeral 10 (FIG. 1) denotes the housing containing an exemplary ingredient content meter and including upright tubular test cell receptacle 12 extending slightly above the meter for receiving a tubular detachable coaxial test cell 14 (FIG. 4). On the front panel 10a of the meter there is window 16 behind which there is a dial card holding channel or slide 18 which extends from opposing sides of housing 10 for receiving from outside the housing detachable and interchangeable dial cards 20. Disposed immediately above window 16 there is meter movement 22 used as hereinafter explained to detect the circuit condition wherein pointer 24 is indicating on graduated scale 26 of card 20 the ingredient content in the material being tested or examined.

To place the meter into operation the power is turned on, then the meter is calibrated to an extremely accurate and stable frequency source 27, such as radio station WWV which continuously emits radio signals receivable throughout the world as indicated by jagged line 27a. As seen schematically in FIG. 2 the meter is preferably provide with a superheterodyne radio receiver pretuned to receive a signal from WWV. Half-wave doublet antenna 28 receives the WWV signal which is RF amplified and fed into mixer 30 in the usual manner. Other ingredient content determination meters 29 similar to the one herein described also simultaneously receive the WWV signal. In the first embodiment of the invention the receiver was permanently tuned to receive one WWV signal and had a local oscillator providing a local reference frequency having a predetermined frequency relationship with the received signal frequency as will become apparent. In the first embodiment the meter housing 10 was provided with an antenna terminal (not shown) on the rear side for connection to an antenna 28 as indicated schematically in FIG. 2.

Mixer 30 beats the incoming radio signal with the locally generated radio signal from crystal controlled oscillator 32 into IF strip 34 feeding second detector 36 which provides a whistle signal from loudspeaker 38 (located in but not shown in the rear of housing 10) whenever local oscillator 32 drifts from the assigned reference frequency. Trimmer 40 operatively connected to knob 41 (FIG. 1) is used to adjust the oscillator 32 frequency over a very limited range to the assigned reference frequency as indicated by silence from speaker 38. It is understood that a pentagrid converter may be substituted for the illustrated heterodyne first detector (oscillator 32 and mixer 30).

It is seen in FIG. 2 that oscillator 32 is of the grid tickler type having the plate electrode of tube 42 connected through winding 44 of oscillator coil 46 to B battery 48. The positive feedback to the control grid of tube 42 to provide oscillations is through winding 50 of oscillator coil 46 which also is a part of the crystal controlled frequency determining tank circuit 52 having crystal 54 thereacross.

Figure 1:
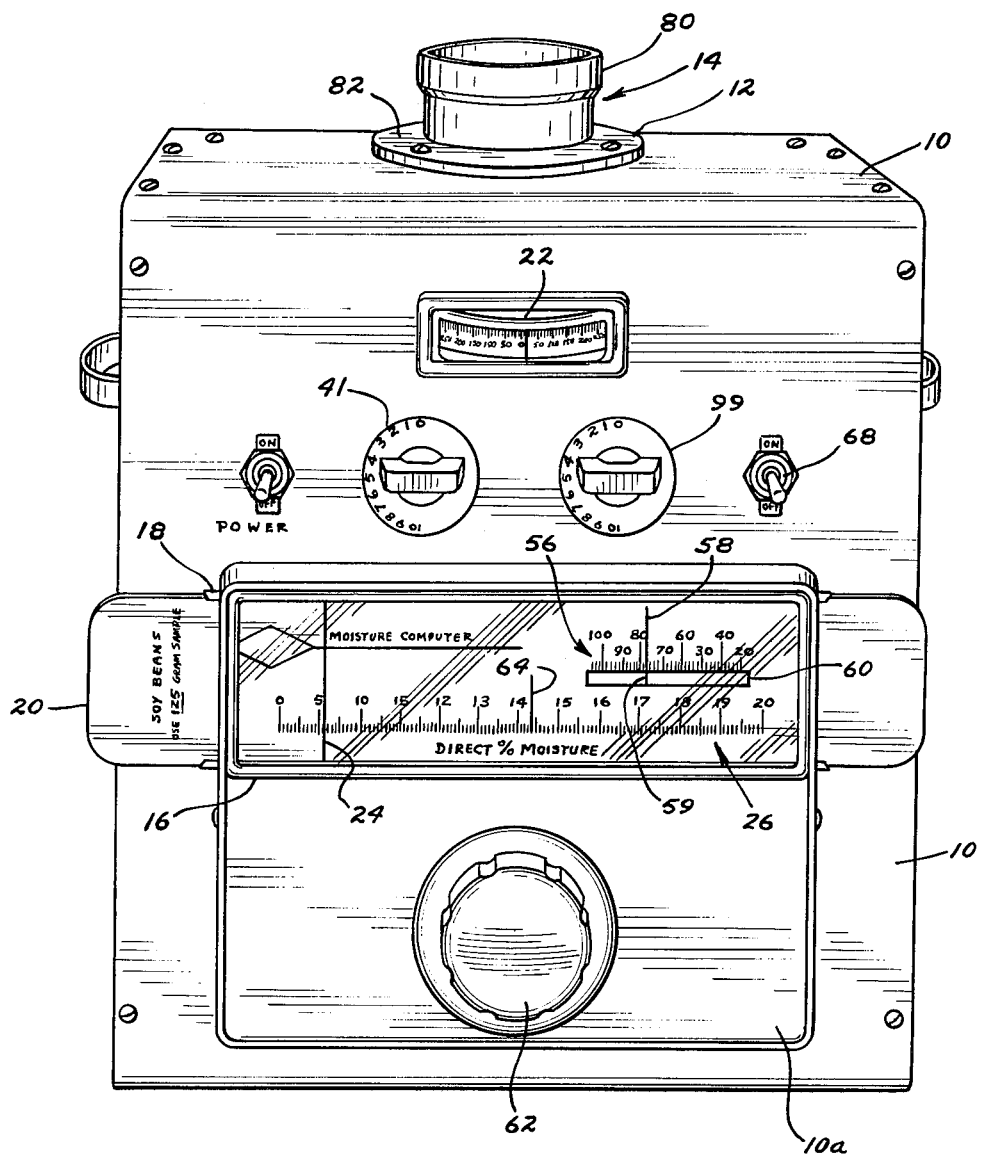
FIG. 1 is a front elevational view of an exemplary meter built according to this invention with an uncompensated temperature uncompensated moisture content reading indicated thereon.

After the local oscillator has been adjustably tuned with WWV the meter is ready to be calibrated to a dial and test cell. Firstly a detachable dial card 20 calibrated for the ingredient and material to be tested is slidably inserted into card slide 18 as best seen in FIGS. 1 and 3. On the upper right hand corner portion of each card there is a graduated temperature scale 56 having a reference temperature mark 58 arbitrarily chosen as 77° F. which is aligned through horizontal narrow slit opening 60 in card 20 with non-reflective mark 59 on a highly reflective background on slide 18 as seen through slit 60. The card 20 is slid in card slide 18 until reference temperature mark 58 is aligned with the mark 59 vertically disposed on slide 18 and visible through slit 60. FIG. 2 shows a highly reflective mark 59a on a dark background of slide 18 which is a preferred embodiment of providing a reference mark on the meter. Knob 62 (FIG. 1) is then turned to drive pointer 24 as hereinbelow described until same coincides with enlarged reference mark 64 on ingredient amount scale 26 as seen in FIG. 2. Mark 64 is located centrally on scale 26 to provide a median content value with which to calibrate the meter. Actually this mark corresponds to and is indicative of the capacitance a median amount of ingredient in a material as indicated on the dial card would provide in a test cell of the structure hereinafter referred to and when measured at the reference temperature of 77° F. The capacitance value was chosen to be the same for all materials to be tested and is provided in the meter in the form of a reference impedance 66 (an electrical reactance) which may be connected across cell 14 to simulate material therein by closing calibration switch 68.

Variable capacitor 70 which is mechanically connected to pointer 24 is adjusted to mark 64 by knob 62 driving drum 72 mounted on shaft 74 which is rotatably mounted in housing 10 and is connected to the rotor plates (not shown) of variable capacitor 70. It is understood that capacitor 70 is constructed of two sets of relatively movable interleaved capacitor plates in a manner similar to the construction of a radio receiver tuning capacitor. Dial cord 76 is wrapped around drum 72 several times for movement therewith, the cord being movably supported on the opposite side of the meter housing 10 by idler wheel 78. Pointer 24 is firmly clipped to cord 76 by a spring clip integral with the pointer as seen in FIG. 2 and moves horizontally with the cord as drum 72 is rotated by knob 62.

Next a test cell is slidably inserted into receptacle 12 and has a snug fit for good electrical contact therewith as best seen in FIG. 4. Cell 14 has radially enlarged upper lip 80 radially outwardly extending detent 81 for supporting cell 14 in the illustrated position. The outside tubular casing 82 of the cell forms the outer coaxial electrode, is in good electrical contact with receptacle 12 and has insulating spacer 84 preferably of plastic closing one end thereof. Spacer 84 also supports central axially extending electrode 86 having insulation 88 thereabout for preventing shorting between electrodes 82 and 86. Screw 90 is inserted through an aperture in spacer 84 and screwed tightly into electrode 86 for supporting same and has a circularly recessed head for engaging center connector 92 for forming an electrical contact therewith. Connector 92 is stationarily associated with and electrically insulated from housing 10 to provide a signal lead to tuned circuit 94 which includes capacitor 70 and coil 96.

The meter and test cell are calibrated to the dial cord 20 by closing switch 68 to place reference impedance 66 into tank circuit 94 which includes coil 96 and capacitors 70 and 98 together with the test cell 14, then adjusting variable capacitor 98 of circuit 94 by knob 99 until the resonant frequency of circuit 94 is the same as the oscillator 32 frequency. This adjustments provides a median value of capacitance in circuit 94 in a predetermined range of capacitance therein represented by the extremities of graduated scale 26 on card 20.

Frequency synchronism between oscillator 32 and tank circuit 94 is detected by a phase detector comprising the series connected circuit including semi-conductor diode or rectifier 100, meter 22 and coils 102 and 104 which are respectively loosely inductively coupled to coil 50 of oscillator 32 and coil 96 of circuit 94. It is appreciated that the voltage induced in coils 102 and 104 vectorially add to produce a minimum rectified current through meter 92 when the two tuned circuits are in frequency synchronism or are at harmonies. The circuits are constructed to be close to the same frequency. Therefore a current null in meter 22 is indicative of frequency synchronism and thus indicative that test cell 14 and circuit 94 are tuned to the dial card 20 at the frequency of oscillator 32 during the just described calibration procedure. It is to be understood that either of the tuned circuits may be operated at a harmonic, preferably an even harmonic, of the other with satisfactory results.

The ingredient content determining meter is now ready to receive material to be tested as indicated on dial card 20 in card slide 18. A predetermined weight of material from a railway boxcar, truck box, elevator bin or the like is placed in hopper 106 of carrying can 108 which is placed hopper end up into radially expanded lip 80 (FIG. 4) of cell 14. The lower end of hopper 106 has inverted conical sides 110 forming a circular opening in the bottom which are blocked by downwardly swinging weighted doors 112 held in blocking position indicated by dotted lines 114 by spring urged radially outwardly retractile pin 116. Before opening doors 112 by depressing lever button 118 the temperature of the material in hopper 106 is noted on dial 120 of gas operated thermometer having sensing element 122 in hopper 106 and supported on can 108 by threaded sleeve 124 mounted in an aperture on the tubular side wall thereof. As best seen in FIG. 6 the cross sectional axial area of doors 112 is greater than the opening formed by conical section 110 and with the doors 112 in the opened position to pass the material from hopper 106 to cell 14 are radially outward from the opening to provide a truly circular cross sectional passage of material. Therefore when lever button 118 is depressed lever 126 rotates clockwise about pivot 128 engaging and moving pin 116 radially outward thereby releasing doors 112 to quickly fall downwardly out of axial alignment with the opening. The material falls uniformly toward conical upper end 128 of electrode 86 with the apex thereof being centrally axially aligned with the center of the circular opening of hopper 106 thereby dispersing the material radially outwardly and uniformly between electrodes 86 and 82. It is important to accurate measurements that the material be uniformly distributed on the bottom 84 of cell 14 as the material forms in the same manner for each measurement a part of the dielectric, and thus the capacitance, between the cell electrodes and a variation of material distribution in the cell causes a variation of capacitance therein.

An additional feature of the test cell is provided by inwardly radially tapering the walls of electrode 86 toward closed end 84 of cell 14. This tapering compensates for variations of granule sizes, i.e., bushel weight, in affecting the total capacitance in the cell. With a larger volume between electrodes at the bottom of the cell the larger granules are permitted to pack together but still use about 75% of the test cell total volume. With the larger percentage of the volume used and with the permitted packing at least at the cell bottom the air spaces between the granules appear to even out. With the bushel weight compensated test cell only one dial card 20 need be used with various bushel weights or various granularity of non-grain materials to be examined.

After the material has been dumped from can 108 into cell 14 the can may be removed, turned upside down to permit doors 112 to reclose by catching on pin 116 ready for usage with another sample of material.

With the material, such as soy bean, now in the test cell 14 the ingredient to be measured, such as moisture, has varied the total capacitance in cell 14 thereby varying the frequency of circuit 94 resulting in increased current flow through meter 22 being indicated by the meter needle deflecting (not shown). To measure the amount of ingredient in the material knob 62 is rotated moving pointer 24, for example to the 9.1% marker on scale 26 as indicated in FIG. 1, at which point meter 22 again indicates a current null. To accurately determine the point of current null knob 62 is rotated back and forth moving the circuit 94 frequency across the oscillator 32 frequency thereby traversing the current null several times.

When the current null is so located, card 20 is moved until the temperature graduation indicative of the previously noted material temperature, for example 48° F. is aligned with the vertical highly reflective line 59 as viewed through the horizontal slit 60 and as best shown in FIG. 8. Since pointer 24 is not moved the direct reading of ingredient content (percent moisture) on scale 26 is modified from 9.1% to 10.5% as indicated in FIG. 8. This temperature compensated reading is provided by displacing the scale 26 with respect to pointer 24 a distance equal to the displacement on temperature scale 56 indicative of the temperature differential between the calibration temperature of 77° and the measured material temperature of 48°.

Since variation of capacitance with moisture varies between different material and additionally the variations of capacitance due to material temperature variations also differ between various materials, a special dial card 20 is prepared for each material with each ingredient to be measured. Therefore the meter and inserted test cell are calibrated to a different dial card each time a different material is inserted into the test cell.

After the above mentioned reading is noted the test cell 14 is removed from receptacle 12 and the material therein removed therefrom and the cell replaced. Alternately, another cell may be inserted in receptacle 12. In any event, the meter should be re-calibrated with an empty test cell to a dial card 20 before another test is made.

As shown in FIG. 2 resonant circuit 94 is the frequency determining circuit of a grid tickler oscillator including vacuum tube 134 being connected to plate coil 136 to B battery 48 and having its control grid coupled to circuit 94. The operation of this oscillator is the same as described for oscillator 32. It is understood that resonant circuit 94 need not form a part of an oscillator as shown, rather it can be used as a filter or impedance variable with frequency as is well known in the art for tuned circuits of the LC tank type.

In applying the just described invention it is apparent frequency variations between a plurality of ingredient meters may result in a substantial variation in the indication of ingredient amount contained in a sample of material. In a large marketing organization obtaining materials from a diversity of sources wherein quality control of the material at the source such as to moisture content is important because of high shipping costs, this invention can provide the necessary source quality control by using the single reference frequency in meters located at each material source. Even if there is a frequency error all meters provide the same error in the same degree which means that the material shipped is still identified relative to other shipments of material without random quality control error.

When using the above described meter in testing material having a temperature radically different from the ambient temperature of the meter for an accurate consistent temperature compensated readings the meter is calibrated prior to bringing the material into the testing area or laboratory. The material to be tested is inserted into a can 108 preferably having the same temperature as the material. The temperature is noted and the material quickly dropped into the test cell; then knob 62 is quickly turned to bring a current null indication on meter 22 before the material temperature in the test cell has had a chance to vary. After the current null is found the dial card 20 is adjusted for temperature compensation.

Alternately the meter may be firstly calibrated, the material temperature noted, the dial adjusted for temperature compensation, the material brought into the testing area and inserted into the test cell 14, then the knob 62 quickly turned to retune the circuit 94 and then the temperature compensated reading taken from dial card 20 as indicated by pointer 24.

In using either of the above methods of performing the steps in making an ingredient content measurement, accurate and consistent readings have been obtained from 30° F. through 100° F. For example frozen corn at 30° F. was examined by a meter and by using the first described method of measurement a reading was obtained from the corn while still frozen within 0.1% of a reading obtained by an accepted standard measuring instrument when the same sample was conventionally measured at room temperature. In other tests using the same methods, durum wheat, oats and western barley among other grains were successfully examined for moisture content at 98° and 100° F. within 0.1% of readings taken by an accepted standard meter when the same samples were later measured at room temperature. In yet other tests too numerous to list herein conducted as the above mentioned tests but at various sample temperatures ranging from 30° through 100° F., the readings were consistently within 0.1% of the readings obtained by an accepted standard moisture content meter when the sample temperature was at room temperature (77°).

Referring now to FIGS. 9 and 10a and 10b, a further embodiment of my invention shown generally in FIG. 9 as including a housing 150, and an antenna 201, an indicating meter dial 151, an ingredient content dial and indicator 20, a material receiving receptacle 108 including a material controlling knob 118, an audio signal output jack 156 and adjusting and function selecting knobs 62, 152, 153, 154 and 155. The use and purpose of the various elements will be described below in connection with the description and operation of this embodiment. Where applicable, like reference characters have been used for like elements.

FIGS. 10a and 10b comprise an electrical schematic diagram of this embodiment of my invention. A double conversion super hetrodyne radio receiver includes an RF amplifier, a pair of super hetrodyne conversion-mixer stages, an IF amplifier stage, a detector, an audio amplifier and meter stage, an output stage connected to an audio transducer and a power supply which may be utilized for the receiver and a test oscillator.

In the signal receiver, the left hand RF amplifier includes a multi-grid vacuum tube 207 having a filament adapted for connection to a suitable source of alternating current energy, a plate electrode, a cathode electrode, a supressor grid electrode, a screen grid electrode and a control grid electrode. Transformer secondary winding 205, adapted to coact with transformer primary winding 204 is connected between the control grid and a ground terminal. A capacitor 206 is connected in parallel with transformer winding 205. Resistor 209 having capacitor 208 in parallel therewith is connected intermediate the cathode electrode and ground. Primary winding 215 on transformer 214 is connected to the plate electrode and to high voltage supply lead 217 through resistor 212. The screen grid is connected to conductor 217 through resistor 211 and to ground terminal through capacitor 210. A further capacitor 213 is connected between the ground terminal and the junction between transformer primary winding 215 and resistor 212. Transformer primary winding 204 is connected between ground and terminal 201 through conductor 202. Conductor 202 is also connected to stationary terminal A on switch deck 191. A further input terminal 200 is connected to terminals B and C on switch deck 191 and to a ground terminal. Terminal 201 is provided for connection to a suitable antenna as illustrated on FIG. 9. The left-hand oscillator-mixer stage includes a dual purpose vacuum tube in which the amplifying and mixing stage has been designated by the reference character 220a and the section utilized for the crystal controlled oscillator has been designated by the reference character 220b. Section 220a includes cathode, anode, control, screen and suppressor electrodes in addition to a filament adapted for connection to a suitable source of energy. The control grid is connected to secondary winding 216 on transformer 214 which is in turn connected to a VC conductor 218 and to ground through capacitor 221. A capacitor 219 is connected in parallel with transformer secondary winding 216. The cathode and suppressor grid electrodes are connected directly to ground. The screen electrode is connected to ground through capacitor 223 and to high voltage supply conductor 217 through resistor 224 connected to terminal 234. The anode electrode of section 220a is connected to terminal 234 on high voltage conductor 217 through transformer primary winding 236 on transformer 235 and resistor 232. Section 220b includes a cathode electrode directly connected to ground, a control grid electrode and an anode electrode connected to terminal 234 and conductor 217 through resistor 225. The anode electrode is also connected to ground through capacitor 231 and to the control grid electrode through capacitor 230 and piezoelectric crystal 229. The control grid electrode is connected to ground through resistor 226 having capacitor 227 in parallel therewith. Capacitor 227 is adapted to provide an adjustment in the frequency of oscillation of section 220b and may be adjusted to driving means 228 and 351 connected to adjusting knob 155.

The second-mixer oscillator stage includes a similar dual purpose vacuum tube having an upper section 242a and a lower section 242b. The upper section of the tube includes cathode, control, screen, suppressor and anode electrodes and a filament adapted for connection to a suitable source of energy. The control grid electrode is connected to the top end of transformer secondary winding 237 on transformer 235. The lower end of transformer secondary winding 237 is connected to terminal 240 on AVC conductor 218 and to ground through capacitor 241. A capacitor 238 is connected in parallel with transformer secondary winding 237. The cathode and suppressor grid electrodes are directly to ground. The screen grid electrode is connected to terminal 252 on high voltage conductor 217 through resistor 246 and to ground through capacitor 247. The anode electrode is connected to terminal 252 on high voltage conductor 217 through transformer primary winding 254 on transformer 253. A capacitor 245 is connected in parallel with transformer primary winding 254. The lower end of primary winding 254 is connected to ground through capacitor 244. Section 242b includes a cathode electrode directly connected to ground, a control grid electrode and an anode electrode connected to terminal 252 on conductor 217 through resistor 248. The anode electrode is connected to the control grid electrode through the capacitor 249 and piezoelectric crystal 250. The control grid is also connected to ground through resistor 251 having an adjustable capacitor 243 in parallel therewith. The capacitance of capacitor 243 may be adjusted through driving means 228 connected to driving means 351 and to knob 155.

The intermediate frequency amplification stage includes a multi-element vacuum tube 259 having cathode, control, screen, suppressor and anode electrodes and a filament adapted for connection to a suitable source of energy. Transformer secondary winding 255 on transformer 253 is connected intermediate the control grid electrode and terminal 256 on AVC conductor 218 through lead 257. The lower end of transformer secondary winding is connected to ground through capacitor 260. A capacitor 258 is connected in parallel with transformers secondary winding 255. The cathode and suppressor grid electrodes are directly connected to ground. The screen grid electrode is connected to termial 265 on high voltage supply conductor 217 through resistor 263 and to ground through capacitor 261. Transformer primary winding 268 on transformer 267 is connected intermediate to terminal 265 and the anode electrode through resistor 264. Capacitor 262 is connected in parallel with transformer winding 268. Capacitor 402 is connected intermediate the lower end of transformer winding 268 and ground. The detector stage utilizes a double diode tube 281 including a pair of cathode electrodes, a pair of anode electrodes and a filament adapted for connection to a suitable source of energy. The left hand anode is connected to AVC conductor 218 through transformer secondary winding 269 on transformer 267 and resistor 266. Capacitors 282 and 283 are connected intermediate the lower end of transformer winding 269 and ground. Capacitor 280 is connected to the lower end of transformer winding 269. The left hand cathode electrode is directly connected to ground. The right anode is connected to resistor 266 through resistor 289 and to ground through resistor 284. The right hand cathode electrode is connected to resistor 266 through resistors 286 and 288. A capacitor 287 is connected intermediate the junction of resistors 286 and 288 and ground.

The audio amplifier stage utilizes a dual purpose vacuum tube having a pair of triode sections 293a and 293b. Each of the sections includes a cathode, control grid and anode electrode and filament adapted for connection to a suitable source of energy. The control grid electrode is connected to ground through resistor 292 and to the right hand cathode electrode in tube 281 through capacitor 285. The control grid electrode is also connected to ground through potentiometer winding 290 having wiper 291 associated therewith. The cathode electrode of section 293b is connected to ground through potentiometer winding 294, having a wiper 295 associated therewith and resistor 296 The control grid electrode is connected to terminal 256 on AVC conductor 218 through conductor 350. The anode electrode is connected to high voltage conductor 217 through resistor 300. A meter-indicator device 151, having resistor 301 in parallel therewith, is connected in parallel with resistor 300 through resistor 403. The lower end of element 151 is connected to ground through resistor 302 The anode electrode on section 293a is connected to high voltage conductor 217 through resistor 297

An audio output stage includes vacuum tube 305 having plate, control grid, screen grid and cathode electrodes and a filament adapted for connection to a suitable source of energy (not shown). The control grid electrode is connected to ground through resistor 308 and is connected to the plate electrode on section 293A of the previous stage through capacitor 304 The cathode electrode is connected to ground through resistor 309 having capacitor 307 in parallel therewith and to the plate electrode through capacitor 306. The plate electrode is connected to high voltage conductor 180 through primary winding 311 on output transformer 310. The screen grid electrode is directly connected to high voltage conductor 180 Secondary winding 312 on output transformer 310 is connected between ground and the movable contact on switch deck 194 through lead 313 and a voice coil winding 314 on loud speaker 500.

It may be noted that switch decks 191, 192, 193 and 194 have corresponding stationary contacts A, B and C and that the movable contacts on the respective switch decks are interconnected through driving means 195 which is operable through a driving means connected to knob 154. Contact A on switch deck 194 is connected to ground.

A power supply includes transformer 160 having primary winding 161 adapted for connection to a suitable source of alternating current energy, a filament secondary winding 167 which includes a pilot lamp connected in parallel therewith and a conductor 168 adapted for connection to the filaments of the vacuum tubes to energize the same, and the high voltage secondary winding 162 having a center tap 165 connected to ground through conductor 166. The left end of inductance 169 is connected to upper end of secondary winding 162 through a pair of rectifiers 164 and to the lower end of winding 162 through a further pair of rectifiers 163. The right end of inductance 169 is connected to high voltage conductor 180 at terminal 170. Terminal 170 is connected to the anode of a voltage regulating tube 177 through resistor 171, terminal 174, resistor 175 and terminal 176. The cathode of tube 177 is connected to ground through lead 178. Terminal 170 is connected to ground through capacitor 172 and terminal 174 is connected to ground through capacitor 173. Terminal 174 is connected to high voltage conductor 217 at terminal 252 through lead 179.

The test oscillator includes a multi-element vacuum tube 330 including a plate electrode, a suppressor grid electrode, a screen grid electrode, a control grid electrode, a cathode electrode and a filament adapted for connection to a suitable source of energy. The plate electrode is connected to ground through capacitor 338 and to the movable contact on switch deck 193 through resistor 331. The suppressor grid electrode is connected directly to ground. The screen grid electrode is connected to ground through capacitor 337 and to the movable contact on switch deck 193 through resistor 332. Stationary contacts B and C on switch decks 193 are connected to high voltage terminal 176 through lead 181. The cathode electrode is connected to ground through a tap 336 on pole winding 335 and conductor 329. The control grid electrode is connected to ground through conductor 329, coil winding 335 and capacitor 334 having resistor 333 and in parallel therewith. A pair of adjustable capacitors 320 and 326 are connected in parallel with coil winding 335. Capacitor 320 is adjustable by operation of adjusting the means 153 through driving means 321. The movable contact on switch deck 192 is connected to ground through lead 329 through adjustable capacitor 323. Capacitor 323 may be adjusted by the operation of adjusting means 62 through driving means 324. Adjusting means 153 is also connected to position an indicator 24 with respect to a scale 26 on a dial card 20. Stationary contact C on switch deck 192 is connected to ground conductor 329 through adjustable capacitor 328 having resistor 327 in parallel therewith. Conductor 316 is provided for connection to the inner electrode, 86 (as in FIG. 2), of a test cell. Conductor 316 may be connected to one of a plurality of stationary contacts on switch means 317 through capacitors 340, 341, 342, 343, 344 or 345 respectively. The movable contact on switch means 317 is connected to the top end of coil winding 335 through conductor 510. The movable contact on switch means 317 may be adjusted through the operation of adjusting means 152 connected thereto through driving means 318. It may be noted that the test oscillator may be any one of a number of suitable oscillatory circuits which include capacitive reactance in the frequency determining portion thereof. Capacitor 326 and capacitor 328 are intended to be adjusted only at periodic intervals to maintain correspondence between various test instrumentalities. Capacitor 328 and resistor 327 comprise a so-called dummy test cell which is inserted into the frequency determining circuit of the test oscillator for calibration purposes when the various switch decks 191, 192, 193 and 194 are positioned with the movable contacts connected to contact C. In this condition, adjustment of variable capacitor 323 by adjusting means 62 and driving means 324 serves to initially calibrate the instrument prior to an actual test. Switch 317 may be utilized to insert one of the pre-adjusted variable capacitors, 340, 341, 342, 343, 344 and 345 in series with the particular test cell utilized in performing an actual test. This provides for the use of different sizes of test cells and increases the flexibility of the test instrument.

*Operation*

In conducting a test utilizing the apparatus of FIGS. 9 and 10A and 10B, the equipment is energized from a suitable source of alternating current. The function selector 154 is positioned so that the movable contacts on the switch decks associated therewith are connected to stationary contact A. In this state, the output of the antenna connected to output terminals 201 and 200 is connected to the input of the double conversion superheterodyne receiver. The loud speaker is connected in circuit to aid in the determination of a maximum output signal. The test oscillator is inoperative. In one embodiment, the received signal is a very stable frequency alternating current signal of 15 megacycles. The crystal frequency determining element 229 of a first local oscillator is nominally at a 12 megacycle frequency and the crystal frequency determining element 250 of the second local oscillator is nominally at a 3455 kilocycle frequency. Adjustable frequency determining elements 227 and 243 in each of the local oscillator circuits are provided to modify the frequency of the local oscillators about these nominal frequencies. It may therefore be seen that the 15 megacycle signal is amplified in the RF stage of the receiving apparatus and is mixed with a 12 megacycle signal in the first conversion stage and that the signal applied to the second conversion stage is of a 3 megacycle frequency. Conversion, through the superheterodyne action of the second conversion stage results in an output signal of 455 kilocycles which is applied to the intermediate frequency amplifier stage. A detector an AVC stage provides an AVC signal for controlling the gain of the initial stages of the receiver and an audio output signal which is applied to a vacuum tube type volt meter stage and an indication is provided on meter 151 of the strength of the received signal. The audio signal is also supplied to a power output stage and thence to the loud speaker for providing an audible indication to the operator. Suitable adjustment of variable capacitors 227 and 243 through the operation of adjusting means 155 results in a maximum signal indication on meter 151 and through loud speaker 500. When this indication is obtained, the apparatus is ready to perform tests on various samples of materials for determining the moisture ingredient content thereof.

In a manner similar to the procedure outlined above in connection with the apparatus of FIG. 2, the test oscillator is suitably calibrated to the dial card by inserting a dummy test cell into the frequency determining circuit of the test oscillator. This is done by positioning the function switch so that the movable contact on each of the decks are connected to stationary contact C. In this condition, the antenna connected to the input of the receiver is grounded, the dummy test cell is inserted into the frequency determining circuit, the test oscillator is energized from the source of direct current enery and the loud spreaker is disconnected from the output of the power amplifier. The output of the test oscillator is coupled to the RF amplifier of the receiver circuit through suitable coupling means (not shown) which may exist by virtue of the physical relationship between the test oscillator and the RF stage of the receiver. The capacitance of vairable capacitor 323 is varied to provide a maximum output from the receiver as it is indicated on meter 151. The function selector switch means is then positioned with the movable contacts of all of the switches on stationary contact B. The receiving antenna remains grounded, the dummy test cell is removed from the frequency determining circuit, the oscillator remains energized from a source of energy and the load speaker is disconnected from the output of the power amplifier. A predetermined amount of material is inserted into the test cell, as discussed above, and the frequency of the oscillator is re-adjusted through adjusting means 153 which is coupled to adjustable capacitor 320 and to the dial indicator 24 through appropriate coupling means. The re-adjustment of the frequency output of the test oscillator to the standard frequency results in positioning of the dial indicator 24 with respect to the dial card 20 at a location which will indicate directly the ingredient content of the material under test.

The combination of the double conversion advantages of the superheterodyne receiver with the remotely located central source of stable frequency results in improved overall performance and uniformity between measurements of ingredient content at diverse locations. It may be noted that the effect of utilizing the double conversion superheterodyne principle is the same as might be gained from utilizing a suitable highly selected band pass filter. The operation of my apparatus is reasonably independent of the amplitude of the received standard frequency signal and in actual operation has proven to provide supreior performance.

The following is a table of values of various components utilized in the illustrated embodiment of my invention.

| Reference characters: | Values |
|---|---|
| 206 | 20 micromicrofarad capacitor. |
| 208 | .047 microfarad capacitor. |
| 209 | 150 ohm resistor. |
| 207 | 6BC5 type tube. |
| 210 | .047 microfarad capacitor. |
| 211 | 120K ohm resistor. |
| 212 | 4.7K ohm resistor. |
| 213 | .047 microfarad capacitor. |
| 219 | 30 micromicrofarad capacitor. |
| 221 | .047 microfarad capacitor. |
| 222 | .047 microfarad capacitor. |
| 223 | .047 microfarad capacitor. |
| 227 | 7–50 micromicrofarad capacitor. |
| 226 | 67K ohm resistor. |
| 229 | 12 megacycle crystal. |
| 230 | .047 microfarad capacitor. |
| 231 | 50 micromicrofarad capacitor. |
| 225 | 22K ohm resistor. |
| 224 | 120K ohm resistor. |
| 232 | 4.7K ohm resistor. |
| 239 | 120K ohm resistor. |
| 238 | 150 micromicrofarad capacitor. |
| 241 | .047 microfarad capacitor. |
| 243 | 7–50 micromicrofarad capacitor. |
| 251 | 67K ohm resistor. |
| 250 | 3455 kc. crystal. |
| 249 | .047 microfarad capacitor. |
| 248 | 22K ohm resistor. |
| 247 | .047 microfarad capacitor. |
| 246 | 120K ohm resistor. |
| 244 | .047 microfarad capacitor. |
| 220 A, B | type 6U8 tube. |
| 242 A, B | type 6U8 tube. |
| 260 | .047 microfarad capacitor. |
| 402 | .047 microfarad capacitor. |
| 261 | .047 microfarad capacitor. |
| 263 | 120K ohm resistor. |
| 264 | 4.7K ohm resistor. |
| 266 | 1 meg ohm resistor. |
| 259 | 6BH6 type tube. |
| 283 | 50 micromicrofarad capacitor. |
| 520 | 22K ohm resistor. |
| 282 | 50 micromicrofarad capacitor. |
| 287 | .01 microfarad capacitor. |
| 286 | 1 meg ohm resistor. |
| 288 | 1 meg ohm resistor. |
| 289 | 220K ohm resistor. |
| 285 | .01 microfarad capacitor. |
| 284 | 220K ohm resistor. |
| 281 | 6AL5 type tube. |
| 290 | 1 meg ohm potentiometer. |
| 294 | 2.5K ohm potentiometer. |
| 292 | 10 meg resistor. |
| 296 | 2.2K ohm resistor. |
| 300 | 470 ohm resistor. |
| 403 | 470 ohm resistor. |
| 302 | 47K ohm resistor. |
| 301 | 200 ohm resistor. |
| 297 | 470K ohm resistor. |
| 293 A, B | 12AU7 type tube. |
| 304 | 0.1 microfarad capacitor. |
| 308 | 470K ohm resistor. |
| 306 | .047 microfarad capacitor. |
| 307 | 25 microfarad capacitor. |
| 309 | 390 ohm resistor. |
| 500 | 3.2 voice coil. |
| 331 | 47K ohm resistor. |
| 332 | 100 ohm resistor. |
| 333 | 67K ohm resistor. |
| 334 | 50 micromicrofarad capacitor. |
| 337 | .047 microfarad capacitor. |
| 338 | .047 microfarad capacitor. |
| 330 | 6BJ6 type tube. |
| 326 | 40–220 micromicrofarad capacitor. |
| 320 | 7–22 micromicrofarad capacitor. |
| 323 | 5–15 micromicrofarad capacitor. |
| 328 | 5–25 micromicrofarad capacitor. |
| 340 | 20–100 micromicrofarad capacitor. |
| 341 | Do. |
| 342 | Do. |
| 343 | Do. |
| 344 | Do. |
| 345 | Do. |
| 163 | type 2F4 diode. |
| 164 | type 2F4 diode. |
| 169 | 8 henries. |
| 171 | 300 ohms. |
| 172 | 30 microfarads. |
| 173 | 30 microfarads. |
| 175 | 5K ohms. |
| 177 | OB2 type voltage regulator tube. |

It is understood that suitable modifications may be made in the structure as disclosed, provided such modifications come within the spirit and scope of the appended claims. Having now therefore fully illustrated and described by invention, what I claim to be new and desire to protect by Letters Patent is:

1. The method of determining the ingredient content of materials to be tested at diverse and remotely disposed locations which comprises the steps of:
   (a) establishing a single source of reference signal;
   (b) uni-directionally transmitting a radio signal proportionally related to said source of reference signal;
   (b') providing a plurality of remotely disposed receivers;
   (c) receiving said signal at a plurality of remotely disposed locations;
   (d) providing a variable frequency oscillator at each remotely disposed location at which material is to be tested;
   (e) applying the output of a oscillator to the receiver for said reference signal;
   (e') providing a sample receiving impedance;
   (f) connecting the sample receiving impedance containing a sample of material to be tested in frequency controlling relationship to the oscillator; and (g) adjusting the frequency of the oscillator and comparing the difference between the reference signal and the output of the oscillator by observing the output of the receiver whereby coincidence of the reference signal and the output of the oscillator is indicated by the lack of output from the receiver.

2. The method of determining the ingredient content of materials to be tested at diverse and remotely disposed locations which comprises the steps of; establishing a single source of reference signal; transmitting a radio signal proportional to the reference signal to remotely disposed locations; providing an adjustable frequency oscillator at a plurality of remotely disposed locations; comparing the frequency of the oscillator with the reference signal; providing a material sample receiving impedance; connecting the sample receiving impedance containing a sample of material to be tested in frequency controlling relationship to the oscillator; and adjusting the frequency of the oscillator to obtain coincidence between the frequency of the oscillator and the source of reference signal by comparing the frequency of the oscillator and the source of reference signal.

3. The method of determining the ingredient content of materials to be tested at diverse and remotely disposed locations which comprises the steps of; establishing a single source of reference signal; uni-directionally transmitting a radio signal proportional to the reference signal to remotely disposed locations; providing a tunable filter means at a plurality of remotely disposed locations; tuning the filter means to said reference signal; providing a local source of signal at each of the remotely disposed locations, the frequency of which may be affected in accordance with the ingredient content of materials to be tested and which may be adjusted by a calibrated frequency controlling means; connecting the output of said local source of signal to said tuned filter means; adjusting the frequency of the local source of signal to the frequency of the tuning means; providing a sample receiving impedance; connecting the sample receiving impedance containing a sample of material to be tested in frequency affecting relationship with the local source of signal; and readjusting the frequency controlling means on the local source of signal to the frequency of the filter means.

4. The method of determining the ingredient content of materials at diverse and remotely disposed locations which comprises the steps of: establishing a single source of reference signal; transmitting a radio signal proportional to the reference signal to remotely disposed locations; providing a source of signal of adjustable frequency at a plurality of remotely disposed locations; adjusting the frequency of said source of signal and comparing the same with said source of reference signal so that said adjustable source of signal is of the same frequency as said source of reference signal; providing a sample receiving impedance connecting the sample receiving impedance containing a predetermined quantity of material to be tested in frequency controlling relationship with the adjustable source of signal; and readjusting the frequency of said adjustable source of signal so that the frequency thereof is the same as the frequency of said reference signal whereby the ingredient content of the material to be tested is indicated by the adjustment necessary to obtain frequency coincidence between the adjustable source of signal and the reference signal.

5. The method of claim 4 in which a tunable filter means is provided to compare the frequency of the reference signal and the adjustable source of signal.

6. Apparatus of the class above described comprising in combination: (a) a single source of reference signal; (b) means for transmitting a radio signal proportional to said signal to remotely disposed locations; (c) means at said remotely disposed locations for receiving said reference signal, said last named means including means for indicating a predetermined relationship with a further signal; (d) oscillator means at said remotely disposed locations, said oscillator means being adapted to provide said further signal and including adjustable impedance means for varying the frequency thereof and having a pair of input terminals adapted to be connected to a material sample receiving impedance means; (e) material sample receiving impedance means comprised of a pair of stationary electrodes defining a material sample receiving chamber of predetermined size; and (f) means connecting the stationary electrodes on said material sample receiving means to the input terminals on said oscillator means whereby the value of said adjustable impedance means is indicative of the dielectric properties of said material sample receiving impedance means.

7. Apparatus for determining the ingredient content of materials to be tested at remotely disposed locations comprising in combination; a single source of reference signal; means for transmitting a radio signal proportional to said reference signal to remotely disposed locations; receiving means at each of said remotely disposed locations for receiving said transmitted signal; means connected to said receiving means for combining a local signal with said transmitted signal, said means having an output proportional to the difference between said transmitted signal and said local signal; a source of local signal connected to said last named means and having an output proportional to the dielectric properties of a material to be tested, said source of local signal including an adjustable frequency controlling means and a material receiving impedance means comprised of a pair of spaced stationary electrodes defining a chamber for receiving a predetermined quantity of material to be tested, said adjustable frequency controlling means and said material receiving impedance means being connected to said local source of signal to affect the frequency thereof, whereby the value of said adjustable frequency controlling means at coincidence between said reference signal and said local source of signal is indicative of the ingredient content of said material.

8. The apparatus of claim 7 in which the means for receiving the transmitted signal is a radio and the source of local signal is an oscillator, the frequency of which is affected by the dielectric properties of the material to be tested and the difference in the magnitude of the frequency controlling means at frequency coincidence before and after a material sample is placed in the impedance means is proportional to the ingredient content of the material to be tested.

9. The apparatus of claim 7 in which the adjustable frequency controlling means is an adjustable capacitor and calibrated indicating means are disposed in ingredient content indicating relationship with the adjustable capacitor.

10. Apparatus for determining the ingredient content of a material to be tested in which the dielectric properties of the material to be tested are proportional to the ingredient content thereof; comprising in combination; a single source of reference signal; means for transmitting a radio signal proportional to said reference signal to remotely disposed locations; means at said remotely disposed locations for receiving said transmitted signal, said means including input and output terminals, adjustable filtering means and means for indicating the magnitude of an output appearing across said output terminals in response to a signal supplied to said input terminals; an adjustable further source of signal including material sample receiving means comprised of a pair of spaced stationary electrodes defining a material sample receiving chamber of predetermined size connected in frequency affecting relationship thereto; and means for selectively connecting the input terminals on said adjustable filter means to said transmitted signal and to said further source of signal representative of the ingredient content of a material to be tested, whereby correspondence between the maximum magnitude of the transmitted signal received from said single source of reference signal and the further source of signal is indicative of the ingredient content of said material to be tested.

11. The apparatus of claim 10 in which the adjustable filtering means is comprised of a tunable radio receiver.

12. The apparatus of claim 11 in which the tunable radio receiver is comprised of a double conversion superheterodyne receiver having a pair of adjustable frequency converting stages.

References Cited by the Examiner

UNITED STATES PATENTS

| | | | |
|---|---|---|---|
| 2,309,481 | 1/1943 | Summerhayes | 324—78 |
| 2,489,296 | 11/1949 | Koechlin | 324—85 |
| 2,516,768 | 7/1950 | Grob et al. | 324—61 |
| 2,693,575 | 11/1954 | Greenwood et al. | 324—61 |
| 2,759,148 | 8/1956 | Store | 324—65 |
| 3,090,004 | 5/1963 | Breen et al. | 324—61 |

WALTER L. CARLSON, *Primary Examiner.*